March 14, 1950 — H. P. PHILLIPS — 2,500,567
CRANKCASE AIR FILTER
Filed Oct. 16, 1946
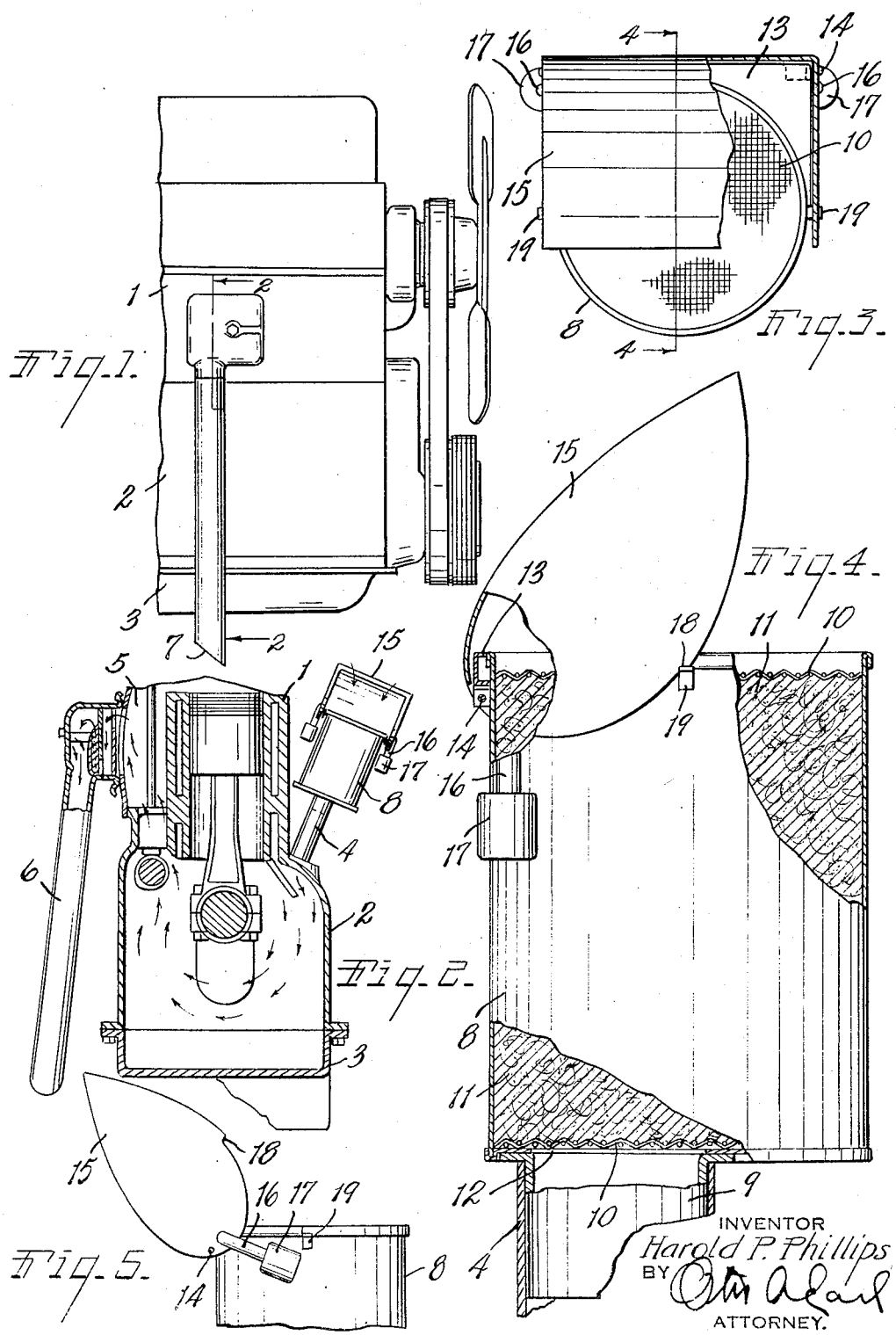
INVENTOR
Harold P. Phillips
BY
ATTORNEY.

Patented Mar. 14, 1950

2,500,567

UNITED STATES PATENT OFFICE 2,500,567

CRANKCASE AIR FILTER

Harold P. Phillips, Hastings, Mich., assignor to Hastings Manufacturing Company, Hastings, Mich.

Application October 16, 1946, Serial No. 703,690

14 Claims. (Cl. 123—171)

This invention relates to improvements in a crank case air filter.

The principal objects of this invention are:

First, to provide an air filter for the crank case of an internal combustion engine that will effectively filter dust and dirt from the air entering the engine and prevent contamination of the lubricating oil.

Second, to provide a filter for the crank case of an internal combustion engine that will be effective over a long period of time.

Third, to provide a filter for the crank case of an automobile engine that will admit the proper amount of air to the crank case regardless of changes in car speed.

Fourth, to provide a baffle for the air inlet to the crank case of an automotive internal combustion engine that will assure the correct amount of ventilation for the crank case regardless of car speed.

Fifth, to prevent the escape of fumes from the engine of an automobile where they may enter the passenger compartment.

Other objects and advantages pertaining to the details and economies of the invention will be apparent from the following description. The invention is further pointed out in the claims.

The drawings, of which there is one sheet, show a prefered form of my filter and baffle applied to an automotive internal combustion engine.

Fig. 1 is a fragmentary elevational view of an internal combustion engine.

Fig. 2 is a fragmentary cross-sectional view along the plane 2—2 in Fig. 1.

Fig. 3 is a plan view partially broken away of the filter shown in Fig. 2.

Fig. 4 is a side elevational view of the filter shown in Fig. 3 partially broken away in cross section along the line 4—4 in Fig. 3.

Fig. 5 is an elevational view of the filter and baffle as it will appear at high car speeds.

In the drawings the reference numeral I indicates an internal combustion engine having a crank case 2 and oil pan 3. The crank case is vented by air entering the pipe 4 which is usually also the oil filter pipe and exhausting through the valve chamber 5 and outlet pipe 6, commonly called the breather pipe. The breather pipe extends downwardly below the engine where it is subject to the slip stream of air passing underneath the car. The bottom of the breather pipe is sloped downwardly toward the front as at 7 to provide a suction effect in the pipe which is particularly effective at high car speeds.

Positioned on the end of the filler pipe is my filter 8 which is a can-like container having a tube 9 attached at the bottom for supporting the filter in an easily removable fashion to permit oil to be added to the engine. The ends of the container are closed by mesh screens 10 which retain a packing 11 of filtering media such as cotton waste or cotton linters. An apertured bottom wall 12 closes the bottom of the container except over the tube 9.

Secured to the back of the container near its top edge is a bracket 13 (see Fig. 4) which supports a pivot pin 14. The pin in turn supports a concave sheet metal air vane or scoop 15 which opens forwardly of the engine over the top of the filter. The rear of the vane has rods 16 secured to each side thereof just forward of the pivot pin 14 and the rods support weights 17 which are thus arranged to bias or tip the vane forwardly over the filter. The side wings of the vane are notched at 18 to engage stops 19 on the sides of the container and prevent the vane from entirely closing the container.

At slow car and engine speeds the vane will be in the position shown in Fig. 4 and will catch air driven back by the engine fan and direct it through the filter. At higher speeds the increased air flow from the fan and through the radiator will tip back the vane as in Fig. 5 permitting the air to spill over the top of the vane instead of being forced into the filter. This prevents the compound effect of the suction of the breather pipe and the ramming effect of the air vane from forcing too much air through the crank case at high speed which would cause a loss of oil.

The filter media in the container is much more effective than the small screens currently in use in the caps of oil filler tubes and the containers can be made of inexpensive material so that they may be thrown away after the manner of oil filters when they become full and clogged. The vane assures an adequate air supply to the crank case at all times without over supply at high speeds. Objectional fumes from the engine will thus be driven out of the breather tube 6 at all times where they will be dissipated underneath the car rather than backing up through the oil filler tube where they may leak through floor board openings into the passenger compartment. This later characteristic of present breather systems is particularly objectionable in old cars in which the joints and seals of the body have become loosened and broken.

Having thus described my invention, what I claim as new and desire to secure by Letters Patent, is:

1. In combination with an internal combustion engine having a breather tube and an oil filler tube, an air filter for the crank case of the engine comprising a container, a bottom wall for said container defining an aperture, a tube secured around said aperture and adapted to fit in the end of said filler tube, screens at each end of said container, cellulose filter material in said container, a pivot pin carried on the back of said container, a forwardly and transversely concave vane pivotally supported on said pin, rods secured to each side of said vane forwardly of said pin and extending therebelow, balance weights on the bottom of said rods and stops on each side of said container at the top thereof, the sides of said vane being notched to engage said stops to limit the forward tipping movement of said vane.

2. In combination with an internal combustion engine having a breather pipe and an oil filler tube, an air filter for the crank case of the engine comprising a container having a bottom wall defining an aperture, a tube secured to said bottom wall around said aperture and arranged to slidably engage said oil filler tube, screens positioned in each end of said container, cotton waste packed between said screens, a bracket secured to the top of said container at the rear thereof, a pivot pin supported by said bracket, an air vane pivotally mounted on said pivot pin and disposed over the top of said container, weights carried on said vane forwardly and below said pivot pin, and stop lugs on said container positioned forwardly of said bracket, the sides of said vane being notched to engage said lugs to limit the forward tipping movement of said vane.

3. In combination with an internal combustion engine having a breather pipe and an oil filler tube, an air filter for the crank case for the engine comprising a container having a bottom wall provided with a nipple adapted to slidably engage said oil filler tube, filtering material in said container, a bracket secured to the top of said container at the rear thereof, a pivot pin supported by said bracket, an air vane pivotally mounted on said pivot pin and disposed over the top of said container, weights carried on said vane forwardly of said pivot pin, and stop lugs on said container positioned forwardly of said bracket, the sides of said vane being arranged to engage said lugs to limit the forward tipping movement of said vane.

4. In combination with an internal combustion engine having a breather pipe and an oil filler tube, an air filter for the crank case for the engine comprising an open top container having an outlet nipple at the bottom thereof adapted to slidably engage said oil filler tube, a screen positioned in the open end of said container, filter media packed in said container, a pivot pin supported on the back of said container, an air directing vane mounted on said pivot pin and disposed over the top of said container, and weights carried on said vane forwardly of said pivot pin, the vane being arranged to engage said container to limit the forward tipping movement of said vane.

5. An air filter for the inlet pipe to the crank case of an internal combustion engine comprising a cylindrical container adapted to be engaged with said inlet pipe, screens partially closing the ends of said container, fibrous filtering material packed between said screens, a bracket formed on the back of said container, a pivot pin supported in said bracket, a forwardly opening downwardly directed air vane pivotally supported on said pin and being weight-balanced to tip forwardly over said container, and stop surfaces engageable between said container and vane to limit the forward tipping motion of said vane.

6. An air filter for the inlet pipe to the crank case of an internal combustion engine comprising a cylindrical container having a bottom provided with a nipple adapted to telescopically engage said inlet pipe, a screen positioned in the top end of said container, fibrous filtering material packed in said container, a pivot pin supported on said container, a forwardly opening downwardly directed air vane supported on said pin and being weight-balanced to tip forwardly over said container, and stop surfaces engageable between said container and vane to limit the forward tipping motion of said vane.

7. An air filter for the air inlet to the crank case of an internal combustion engine comprising a container having one end defining an aperture and open at its other end, an attaching member secured around said aperture and arranged to fit the opening into said crank case, screens partially closing the ends of said container, fibrous filter material packed between said screens, and a vane pivotally mounted over the open end of said container, said vane being weight-biased toward a forward position to direct air into said container and tiltable by increased air pressure thereagainst into a backward air-spilling position.

8. An air filter for the air inlet to the crank case of an internal combustion engine comprising a container having one end defining an aperture and open at its other end, an attaching member secured around said aperture and arranged to fit the opening into said crank case, a screen partially closing the open end of said container, fibrous filter material packed in said container, and a vane pivotally mounted over the open end of said container, said vane being biased toward a forward position to direct air into said container and tiltable by increased air pressure thereagainst into a backward air-spilling position.

9. An air filter for the air inlet to the crank case of an internal combustion engine comprising a container having one open end, a hollow attaching member secured to the other end of said container and arranged to fit the opening into said crank case, filter material packed in said container, and a vane pivotally mounted over the open end of said container, said vane being biased toward a forward position to direct air into said container and tiltable by increased air pressure thereagainst into a backward air-spilling position.

10. Breather control mechanism for the crank case of an internal combustion engine having an opening thereinto and an outlet breather pipe opening therefrom comprising a hollow support member adapted to fit into said opening and a forwardly directed air vane pivotally mounted on said support member, said vane being weight-biased to a forward position to direct air into said hollow member and tiltable under the influence of increased air pressure thereagainst into a backward air-spilling position.

11. Breather control mechanism for the crank case of an internal combustion engine having an opening thereinto and a suction type breather pipe opening therefrom comprising a hollow support member adapted to fit said opening and an air directing vane pivotally mounted on said support member, said vane being biased to a position to direct air into said hollow member and tiltable under the influence of increased air pressure thereagainst into an air-spilling position.

12. A filter comprising a container provided with filtering material permitting the passage of air therethrough, said container having a coupling nipple at the bottom thereof adapted to telescopingly engage the filler pipe of an internal combustion engine crank case, and a deflector vane having a curved rear wall and side walls of substantial width, said vane being pivotally mounted on said container at the rear side wall thereof to swing to a rearwardly inclined position and to a forwardly inclined position, said vane being biased to normally swing to its forward position, and a means limiting its forward movement.

13. A filter comprising a container provided with filtering material permitting the passage of air therethrough, said container having a coupling nipple at the bottom thereof adapted to telescopingly engage the filler pipe of an internal combustion engine crank case, and a deflector vane pivotally mounted on said container at the rear side wall thereof to swing to a rearwardly inclined position and to a forwardly inclined position, said vane being biased to normally swing to its forward position, and a means limiting its forward movement.

14. Mechanism for ventilating the crank case of the engine of automotive vehicle having spaced openings in said crank case comprising, a breather pipe connected to one of said openings, the open end of said breather pipe being positioned where the slip stream of air due to movement of the vehicle will pass over said pipe to create a suction in said breather pipe, a second pipe connected to said other opening and arranged to have air forced therethrough into said crank case, and a vane for controlling the admission of air to said other pipe, said vane being biased and responsive to the flow of air past said engine to reduce the amount of air forced through said second pipe as the velocity of air passing the open end of said breather pipe increase.

HAROLD P. PHILLIPS.

REFERENCES CITED

The following references are of record in the file of this patent:

UNITED STATES PATENTS

| Number | Name | Date |
| --- | --- | --- |
| 1,822,201 | Cochrane | Sept. 8, 1931 |
| 1,968,119 | Barker | July 31, 1934 |
| 2,073,156 | Kamrath | Mar. 9, 1937 |